United States Patent
Ostwald et al.

(10) Patent No.: US 6,754,037 B1
(45) Date of Patent: Jun. 22, 2004

(54) SMALL LIBRARY HORSESHOE ARCHITECTURE

(75) Inventors: Timothy C. Ostwald, Louisville, CO (US); Daniel James Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/362,583

(22) Filed: Jul. 28, 1999

(51) Int. Cl.[7] ............................................. G11B 15/68
(52) U.S. Cl. .................. 360/92; 360/98.06; 369/30.45; 369/30.49
(58) Field of Search ................................ 360/92, 98.01, 360/98.04, 98.05, 98.06, 99.01; 369/30.06, 30.38, 30.39, 30.4, 30.41, 30.43, 30.45, 30.47, 30.49, 30.63

(56) References Cited

U.S. PATENT DOCUMENTS

| | | | | |
|---|---|---|---|---|
| 5,285,335 A | * | 2/1994 | Sato ............................ | 360/92 |
| 5,293,284 A | * | 3/1994 | Sato et al. ................... | 360/92 |
| 5,359,476 A | * | 10/1994 | Dalziel ........................ | 360/92 |
| 5,461,518 A | * | 10/1995 | Saiki et al. .................. | 360/69 |
| 5,684,654 A |   | 11/1997 | Searle et al. ................. | 360/92 |
| 5,870,245 A |   | 2/1999 | Kersey et al. ................ | 360/92 |
| 5,892,750 A |   | 4/1999 | Barkley et al. .............. | 369/178 |
| 6,104,693 A | * | 8/2000 | Coffin et al. ................. | 369/178 |
| 6,130,800 A | * | 10/2000 | Ostwald ....................... | 360/92 |
| 6,222,699 B1 | * | 4/2001 | Luffel et al. .................. | 360/92 |
| 6,466,396 B1 | * | 10/2002 | Egan et al. ................... | 360/92 |
| 6,498,771 B1 | * | 12/2002 | Boyce et al. ............. | 369/30.34 |
| 6,570,735 B2 | * | 5/2003 | Coffin et al. ................. | 360/92 |

* cited by examiner

*Primary Examiner*—Jefferson Evans
(74) *Attorney, Agent, or Firm*—Brooks Kushman P.C.

(57) ABSTRACT

A storage library suitable for rack-mount and desktop installations. Internally the storage media cartridges and one or more media drives are arranged in a horseshoe configuration. The storage media cartridges are positioned in slots along the left and right sides of the library, and the media drives are positioned adjacent the back side. Additional slots may be provided near the middle of the horseshoe configuration to increase the library's storage capacity. A robotic mechanism is positioned between the two rows of storage media cartridges and operative to transport the storage media cartridges between the media drive and the slots. The slots are arranged so that the storage media cartridges can be installed and removed from the library through an opening provided in the front side of the library. The storage media cartridges are oriented in the slots so that their labels are viewable through the opening. A bar-code reader may be mounted on the robotic assembly to read bar-codes on the labels.

9 Claims, 9 Drawing Sheets

SMALL LIBRARY HORSESHOE ARCHITECTURE

TECHNICAL FIELD

This invention is related to the field of desktop and rack-mounted libraries that read and write information in removable storage media cartridges.

BACKGROUND ART

Magnetic tape cartridges are often used to backup computer hard drives and disk arrays nightly, and to provide mass storage for information that is not accessed on a regular basis. For standalone computers and small network systems, a single manually loaded tape drive is sufficient to handle most backup and archived information needs. As the storage requirements expand, however, it becomes practical to integrate the tape drive into an automated library that can mount and dismount one of several tape cartridges under computer control.

Small to medium office network systems can benefit from a small desktop or rack-mounted library having multiple tape cartridges. Current magnetic tape cartridges, such as the digital linear tape (DLT) and eight-millimeter formats, have capacities greater than twenty gigabytes per cartridge. These capacities are sufficient to copy the entire contents of modest disk servers on just one cartridge. By providing seven or more cartridges in the library, backup operations can be performed automatically every day for an entire week.

The capacity of rack-mounted libraries is usually limited by the standard nineteen-inch width of the rack, the need for a user to access the cartridges, and the desire for the user to be able to see the labels on the cartridges. Many libraries are configured with all of the cartridges and drives lined up across the front of the housing with the cartridge labels facing outward. A robotic mechanism transports the cartridges to and from the drives from the label side of the cartridges. Operating on the label side of the cartridges also allows the robotic mechanism to carry a bar-code reader that can scan bar-codes on the labels for positive cartridge identification. The advantages of these configurations are easy user access to the cartridges, a direct user and robotic mechanism view of the labels to determine quickly which cartridges are installed, a simple robotic mechanism, and a low housing height determined mainly by the height of the cartridges. The primary disadvantage is that only a limited number of cartridges and drives fit across the nineteen-inch rack width. Using the DLT cartridges as an example, only seven DLT cartridges and one DLT media drive fit within the nineteen-inch width constraint.

To increase the total capacity of the library, some library configurations position the drives in a back row behind the cartridges. Front row space vacated by the drives is used to hold additional cartridges. The robotic mechanism is now positioned between the cartridges and drives. Using the DLT cartridge example again, approximately eleven DLT cartridges can be positioned across the front row of the housing and up to three DLT media drives can be positioned in the back row. The primary limitation of these configurations is still the total number of cartridges that can be installed at any given time. A bar-code reader requirement acts to reduce the total number of cartridges. Since the robotic mechanism cannot view the bar-codes on the labels directly, the bar-code reader cannot be mounted on the robotic mechanism. Instead, the bar-code reader is installed facing inward in one cartridge position. Here the bar-code reader scans the cartridge held in front of it by the robotic mechanism. The tradeoff for the bar-code reader capability is one less cartridge in the library.

Two other configurations have been used to increase the total number of cartridges within the library. Some configurations place additional cartridges in the back row next to the drives. An example of this configuration can be seen in U.S. Pat. No. 5,892,750, issued to Barkley et al., on Apr. 6, 1999. Barkley discloses a library having ten cartridges held in a removable magazine positioned at the front of the housing. Five additional cartridges are stored in a back row next to the drive. These five additional cartridges cannot be directly accessed by a user, nor can they be directly viewed by a user who wishes to read their labels. Another library configuration stacks a second row of cartridges above the first row at the front of the housing. Here, all of the cartridges are readily accessible and viewable to the user. The tradeoffs for having vertically stacked cartridges are that the height of the housing is doubled, and this library requires a more complicated robotic mechanism that can move up and down as well as left and right.

Yet another configuration is disclosed in U.S. Pat. No. 5,870,245 issued to Kersey et al., on Feb. 9, 1999. Kersey discloses a library where the cartridges and drives are aligned in a row perpendicular to the front of the housing. In this approach, the total number of cartridges and drives are limited by the depth of the housing instead of by the width of the housing. Since the housing can be greater than nineteen inches deep, more distance is available to arrange the cartridges and drives. One limitation of the Kersey disclosure is that all of the cartridges are hidden from the user when installed in the library. In order to access or view the label of any one cartridge, a magazine holding all of the cartridges must be removed from the library. Removing the magazine from the library causes all cartridge transfers to and from the magazine to be halted until the magazine is reinstalled.

To increase the capacity of rack-mounted libraries, more efficient placements of the cartridge, drive and robotic mechanism are required. What is desired is a configuration in which the height of the housing is kept to a minimum, all of the cartridges are directly accessible by the user, and all of the labels are directly viewable by the user and the robotic mechanism.

DISCLOSURE OF INVENTION

The present invention is an automated storage library suitable for rack-mount and desktop installations. Storage media cartridges are positioned in rows along the left and right sides of the library's housing, and one or more media drives are positioned along the back side of the housing creating a "horseshoe" like architecture. A robotic mechanism operates between the left and right rows transporting the storage media cartridges to and from the media drives. This architecture results in a large number of storage media cartridges within the nineteen-inch width rack-mount constraint. Access to the storage media cartridges is provided through an opening provided in the front side of the housing. The storage media cartridges are oriented in their rows so that their label sides are generally facing inward toward the middle of the housing. This inward orientation allows a user to view the labels through the opening in the front side of the housing.

The inward facing label sides of storage media cartridges make it easy for the library to read the bar-codes on the labels using a bar-code reader mounted on the robotic mechanism. All of the labels can be read by the bar-code reader without moving any of the storage media cartridges from their slots. Alternatively, the bar-code reader may be mounted off of the robotic mechanism. This configuration requires that the robotic mechanism remove the storage media cartridges from their slots and transport them to the bar-code reader for scanning.

The robotic mechanism generally moves in at least three degrees of freedom. In the first degree of freedom, the robotic mechanism moves along the rows of storage media cartridges to align itself with the desired storage media cartridge or media drive. In the second degree of freedom, a robotic mechanism rotates to align its picker assembly with the left or right rows of storage media cartridges, or the media drives. The third degree of freedom is supplied by the picker assembly to insert and remove storage media cartridges from the slots and the media drives.

When the library contains several media drives, the media drives may be oriented along an arc that matches the rotation of the picker assembly. Where space constraints force the media drives to be in a straight line parallel to the back side of the housing, then two alternate configurations are possible. First, the robotic mechanism may include a fourth degree of freedom that allows the robotic mechanism to move into alignment with the appropriate media drive. Alternatively, the media drives may be mounted on a linear carriage that moves the appropriate media drive into alignment with the robotic mechanism.

In another embodiment, the robotic mechanism is designed to rotate about a fixed position. Here, both rows of storage media cartridges and the multiple media drives are mounted on linear carriages. These linear carriages bring the desired storage media cartridge and media drive to the robotic mechanism. The robotic mechanism rotates its picker assembly to face the left side of the library to obtain and deposit storage media cartridges in the left row. Rotating the picker assembly to face the right side of the library provides access to the storage media cartridges in the right row. To insert or extract a storage media cartridge from a media drive, the robotic mechanism rotates the picker assembly to face the back side of the library.

Where only one or two media drives are installed in the library, the unused space beside the media drives may be used to hold more storage media cartridges. This allows for additional storage capacity in the library. The storage media cartridges may also be mounted in magazines for quick mass installation and removal.

Accordingly, it is an object of the present invention to provide an efficient packaging configuration for the storage media cartridges and media drives in a library housing suitable for rack-mount and desktop operations.

Another object of the present invention is to orient the storage media cartridges so that their labels can be viewed by a user at the front side of the housing, and by a bar-code reader mounted on the robotic mechanism.

These and other objects, features and advantages will be readily apparent upon consideration of the following detailed description in conjunction with the accompanying drawings.

BEST MODE FOR CARRYING OUT THE INVENTION

The Electronic Industries Alliance of Arlington, Va., controls the specification EIA-310 that defines the standards for nineteen-inch (483 millimeters) cabinets, racks, panels and associated equipment.

Figure 1:
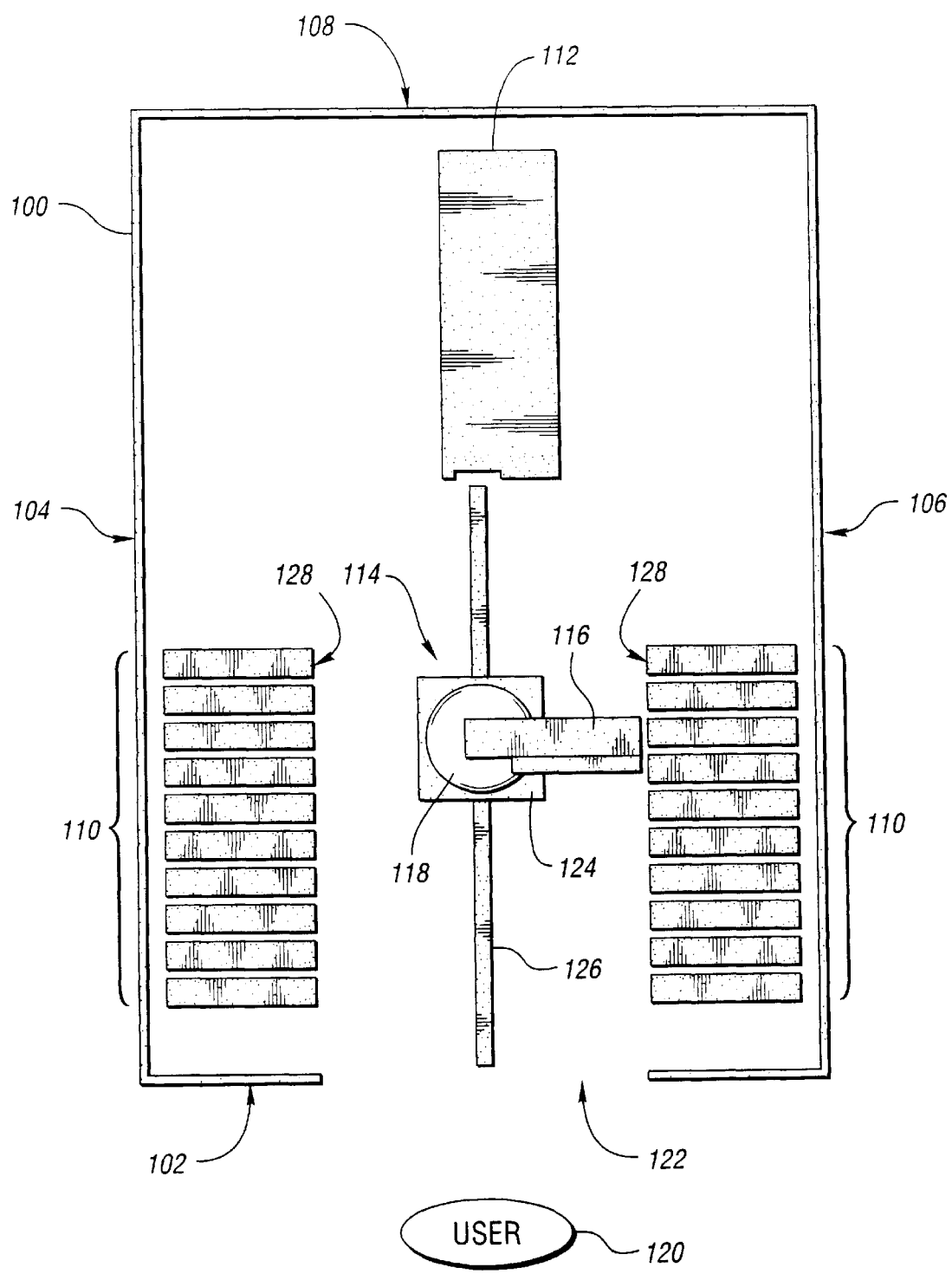
FIG. 1 is a top view of a library implementing the present invention.

FIG. 1 is a top view of a library implementing the present invention. The library has a housing 100 defining four sides, a front side 102, a left side 104, a right side 106 and a back side 108. In the preferred embodiment, the width of the housing is nineteen inches (483 millimeters), as measured from the left side 104 to the right side 106, in compliance with EIA-310. The height of the housing is seven inches (178 millimeters) which is four rack units as defined by EIA-310. The depth of the housing is twenty-seven inches (686 millimeters) as measured from the front side 102 to the back side 108. Other housing widths, heights and depths may be used within the scope of the present invention.

Internal to the library, multiple storage media cartridges 110 and one or more media drives 112 are packaged in a horseshoe shaped, "U" shaped, or cup-shaped configuration. One row of storage media cartridges 110 are positioned in slots (not shown) along the left side 104 of the housing 100. The media drive 112 is positioned along the back side 108. A second row of storage media cartridges 110 are positioned in slots (not shown) along the right side 106, completing the horseshoe configuration. A robotic mechanism 114 is positioned between the two rows of storage media cartridges 110 where it can access all of the storage media cartridges 110 and the media drive 112. The storage media cartridges 110, media drive 112 and robotic mechanism 114 are coplanar to minimize the height of the housing 100. In the preferred embodiment, at least ten magnetic digital linear tape type storage media cartridges 110 are stored along the left side 104 and at least ten more along the right side 106 of the housing 100.

To manipulate the storage media cartridges 110, the robotic mechanism 114 has a picker assembly 116. The picker assembly 116 has the ability to grasp one storage media cartridge 110 at a time, remove that storage media cartridge 110 from a slot or the media drive 112, and insert it into the media drive 112 or any empty slot. A rotational carriage 118 rotates the picker assembly 116 to face the left and right rows of storage media cartridges 110 and the media drive 112. The rotational carriage 118 may also rotate the picker assembly 116 toward an opening 122 provided in the front side 102 of the housing 100. This orientation allows the picker assembly 116 to receive or give a storage media cartridge 110 to the user 120 through the opening 122. A linear carriage 124, operating on a track 126, moves the rotational carriage 118 and the picker assembly 116 parallel to the two rows of storage media cartridges 110. The linear carriage 124 aligns the picker assembly 116 before the desired storage media cartridge 110, empty slot, or the media drive 112. As mentioned earlier, the linear carriage 124 may also position the picker assembly 116 near the opening 122 to receive or give a storage media cartridge 110 to the user 120.

The opening 122 in the front side 102 of the housing 100 serves several purposes. First, the user inserts and removes the storage media cartridges 110 from the library through the opening 122. Maintenance on the robotic mechanism 114, media drive 112, and other internal components (not shown) may be performed through the opening 122. Also, the user can view labels on the label side 128 of the storage media cartridges 110 looking in through the opening 122. Opening 122 may be a fixed hole in the front side 102 of the housing 100, or it may be created by moving part or all of the front side 102. In the preferred embodiment, the entire front side 102 is hinged at the bottom and swings downward to create the opening 122.

Figure 2:
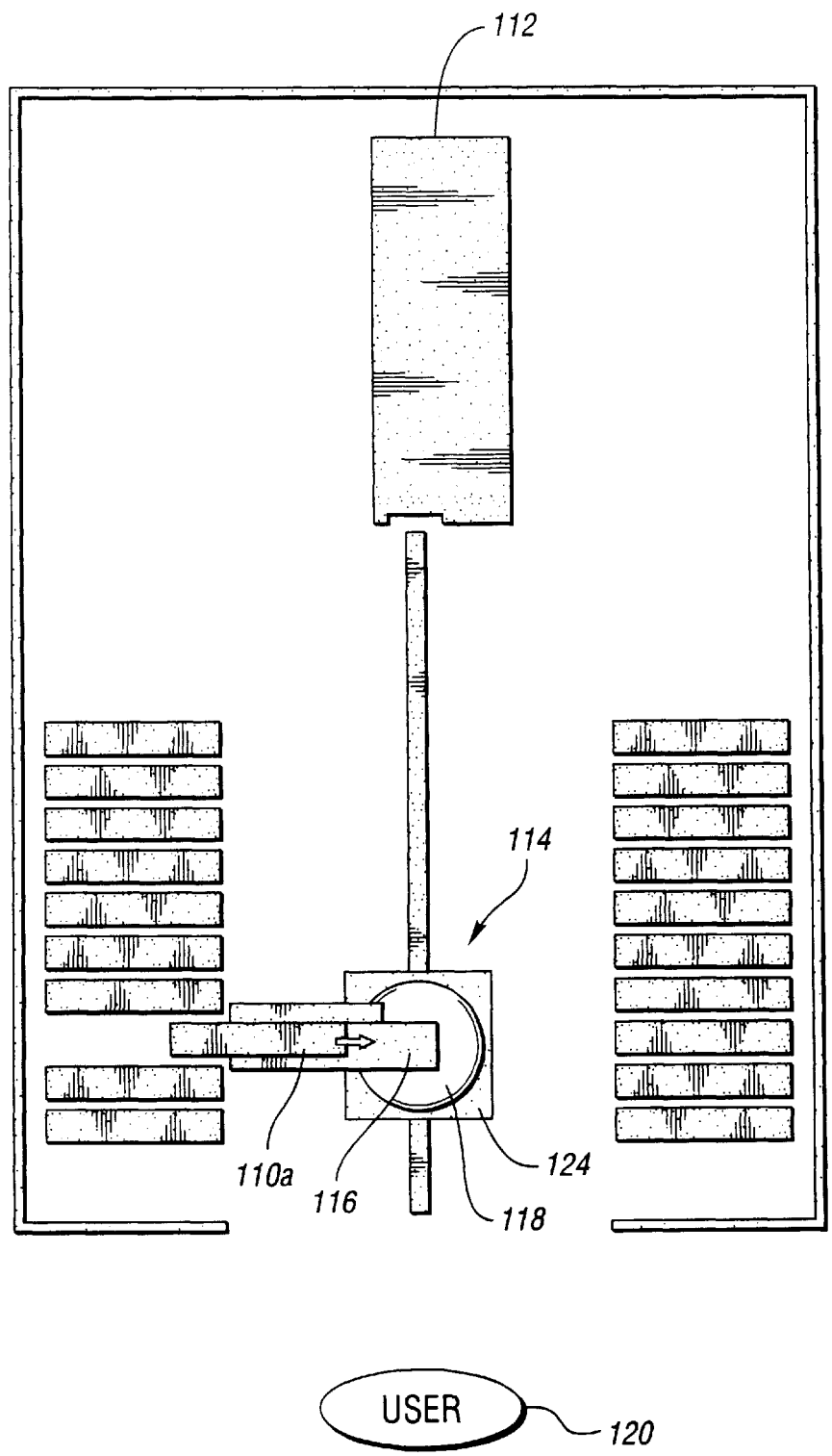
FIG. 2 is a top view with the robotic mechanism removing a storage media cartridge from a slot.
Figure 3:
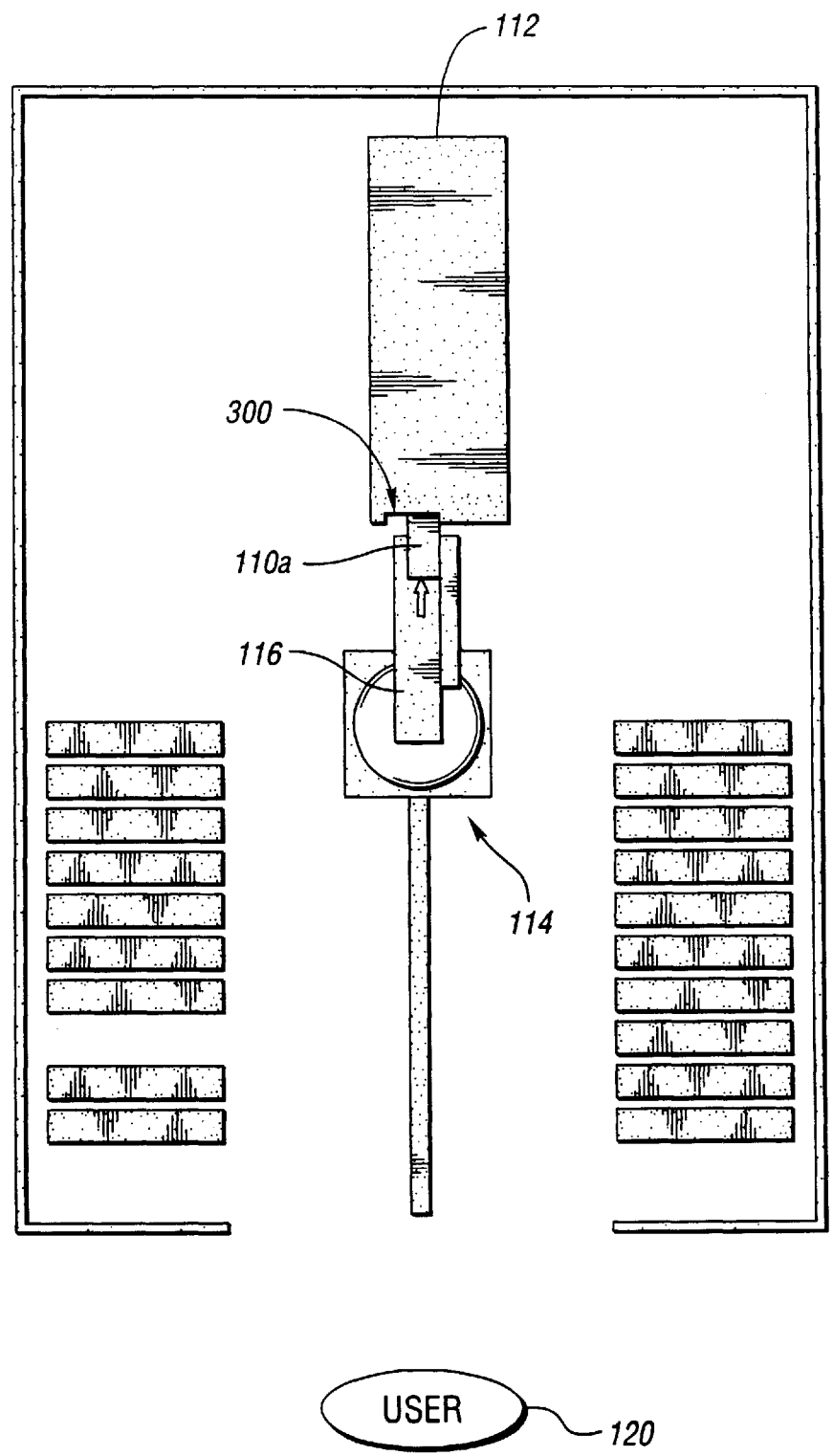
FIG. 3 is a top view with a robotic mechanism inserting the storage media cartridge into a media drive.

FIG. 2 and FIG. 3 show an example operation of the robotic mechanism 114 moving a desired storage media cartridge 110a from a slot in the left row to the media drive 112. Referring to FIG. 2, the robotic mechanism 114 first aligns with the desired storage media cartridge 110a. Next, the gripper assembly 116 grips and removes the desired storage media cartridge 110a from its slot. The rotational carriage 118 rotates the desired storage media cartridge 110a for insertion into the media drive 112. Simultaneously, or independently of the rotational carriage 118 motion, the linear carriage 124 moves the desired storage media cartridge 110a toward the media drive 112. Referring to FIG. 3, once the robotic mechanism 114 is aligned with the media drive 112, the picker assembly 116 inserts the desired storage media cartridge 110a into the media drive 112 through a port 300. To return the desired storage media cartridge 110a to its original slot, the steps of the above operation are reversed. The process to move the desired storage media cartridge 110a from one slot to another is similar to the process of moving the desired storage media cartridge 110a to the media drive 112 with the destination slot substituted for the media drive 112.

Figure 4:
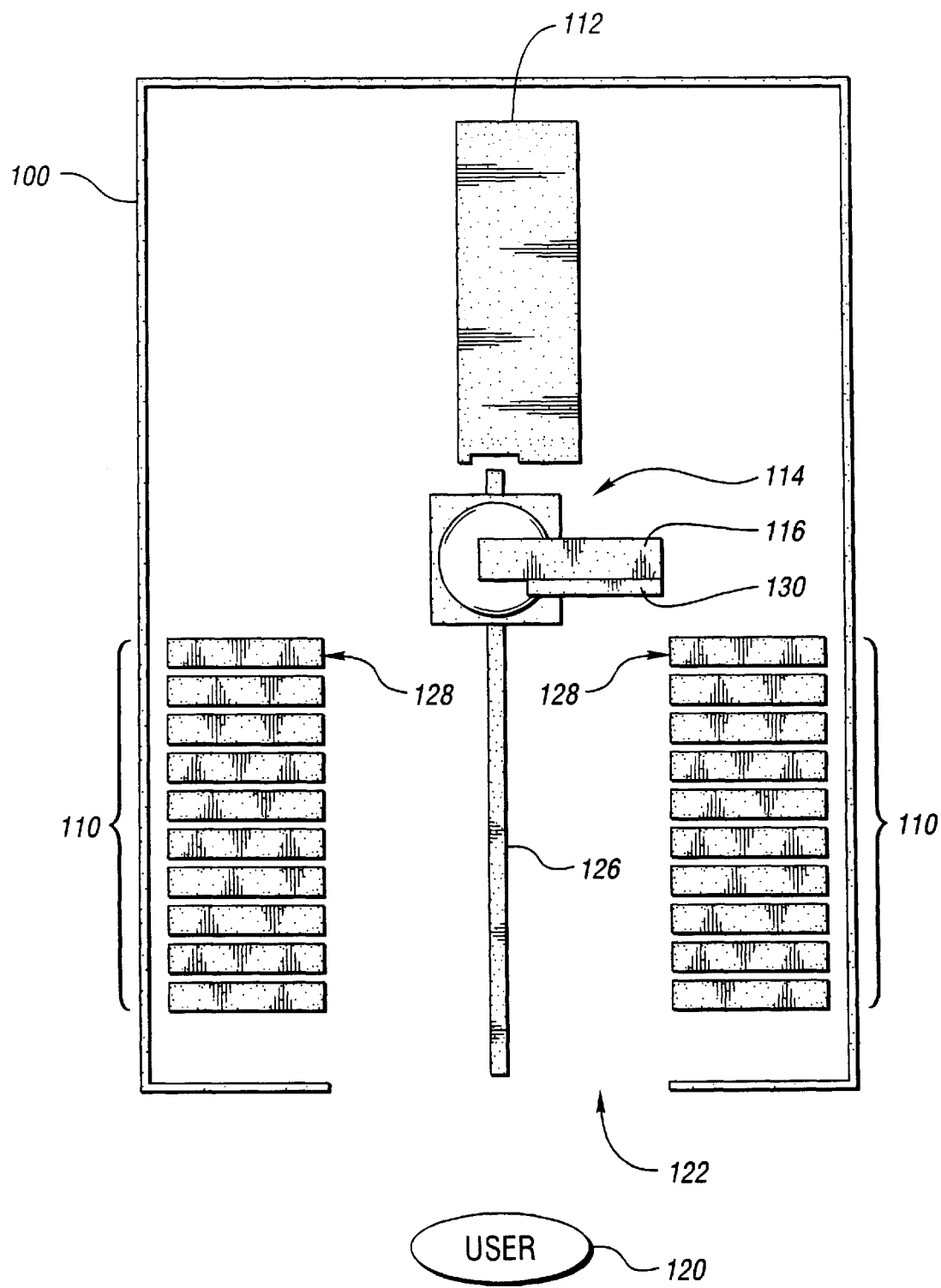
FIG. 4 is a top view with the robotic mechanism positioned to allow direct viewing and access to the storage media cartridges.

Referring to FIG. 4, one advantage of the present invention is that the horseshoe configuration allows the label side 128 of all of the storage media cartridges 110 to be viewed by the user 120 through the opening 122. Each storage media cartridge 110 is oriented in the slots with its label side 128 faces inward toward the track 126. To avoid any obstructions of the label side 128 by the robotic mechanism 114, the robotic mechanism 114 may be moved to the end of the track 126 nearest the media drive 112. By making the opening 122 sufficiently large, and with the robotic mechanism 114 parked near the media drive 112, the user 120 has room to reach into the housing 100 to install and remove the storage media cartridges 110 from all of the slots.

Another advantage of having all of the label sides 128 facing the track 126 is that it allows the library to read bar-codes on the labels using a bar-code reader 130 mounted on the robotic mechanism 114. In the preferred embodiment, the bar-code reader 130 is mounted on the rotational carriage 118 so that it parallels the picker assembly 116. To read a bar-code on the label side 128 of a storage media cartridge 110, the robotic mechanism 114 aligns the bar-code reader 130 with the storage media cartridge in the same fashion that it aligns the picker assembly 116 with the storage media cartridge 110.

Figure 5:
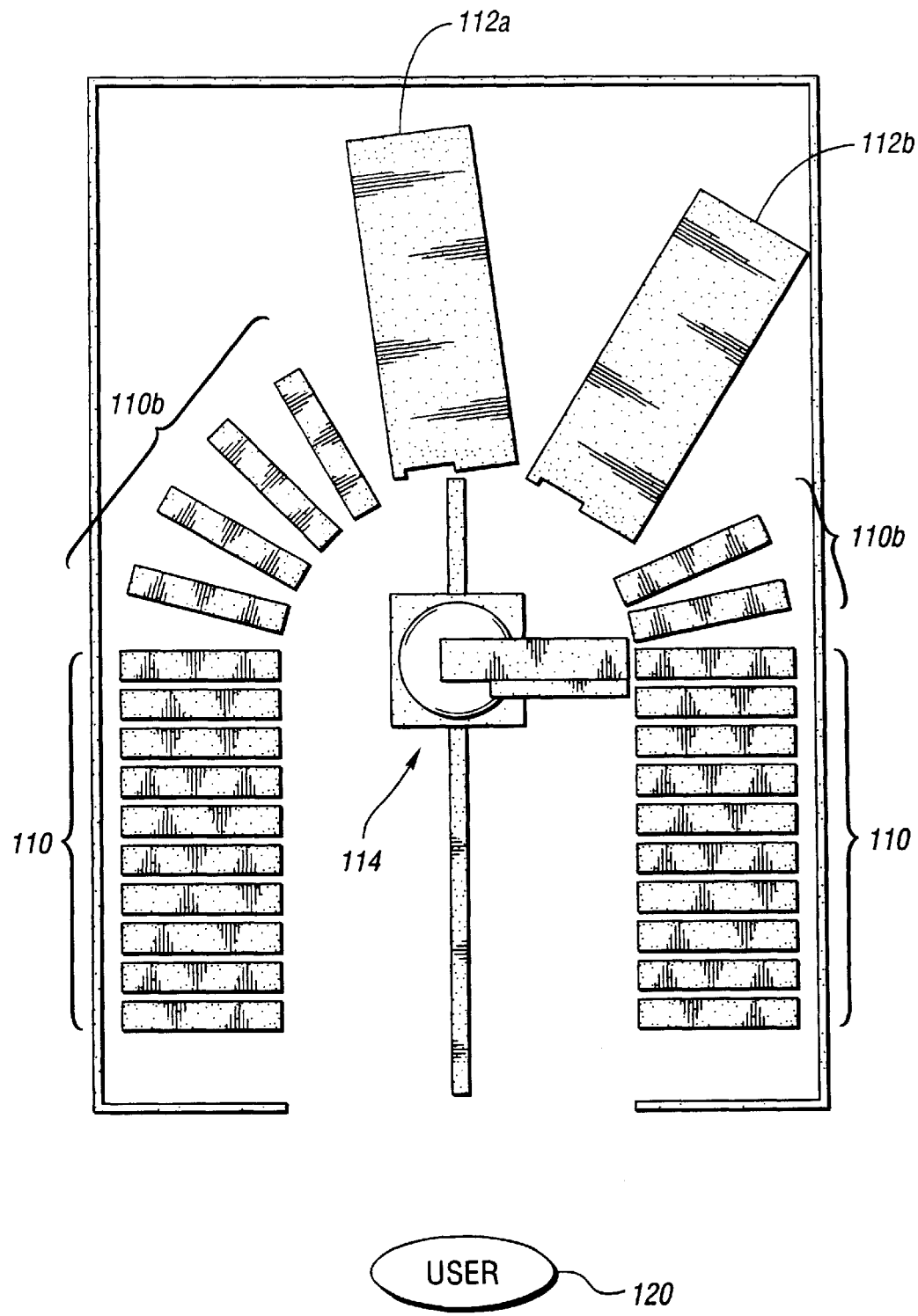
FIG. 5 is a top view of a second embodiment of the present invention where storage media cartridges are on three sides.

FIG. 5 is a top view of a second embodiment of the present invention having a second media drive 112b and six additional storage media cartridges 110b for a total of twenty-six storage media cartridges 110. Here the second media drive 112b and the additional storage media cartridges 110b are positioned along the arc of the horseshoe shape. The combination of the media drives 112a and 112b allow this embodiment to transfer data faster than the single media drive 112 embodiment shown in FIG. 1. Also, the additional storage media cartridges 110b give this embodiment a larger storage capacity than the library shown in FIG. 1. The disadvantage of this embodiment, as compared with the embodiment shown in FIG. 1, is that direct access to the additional storage media cartridges 110b requires the user 120 to reach over, or to one side to the robotic mechanism 114.

Figure 6:
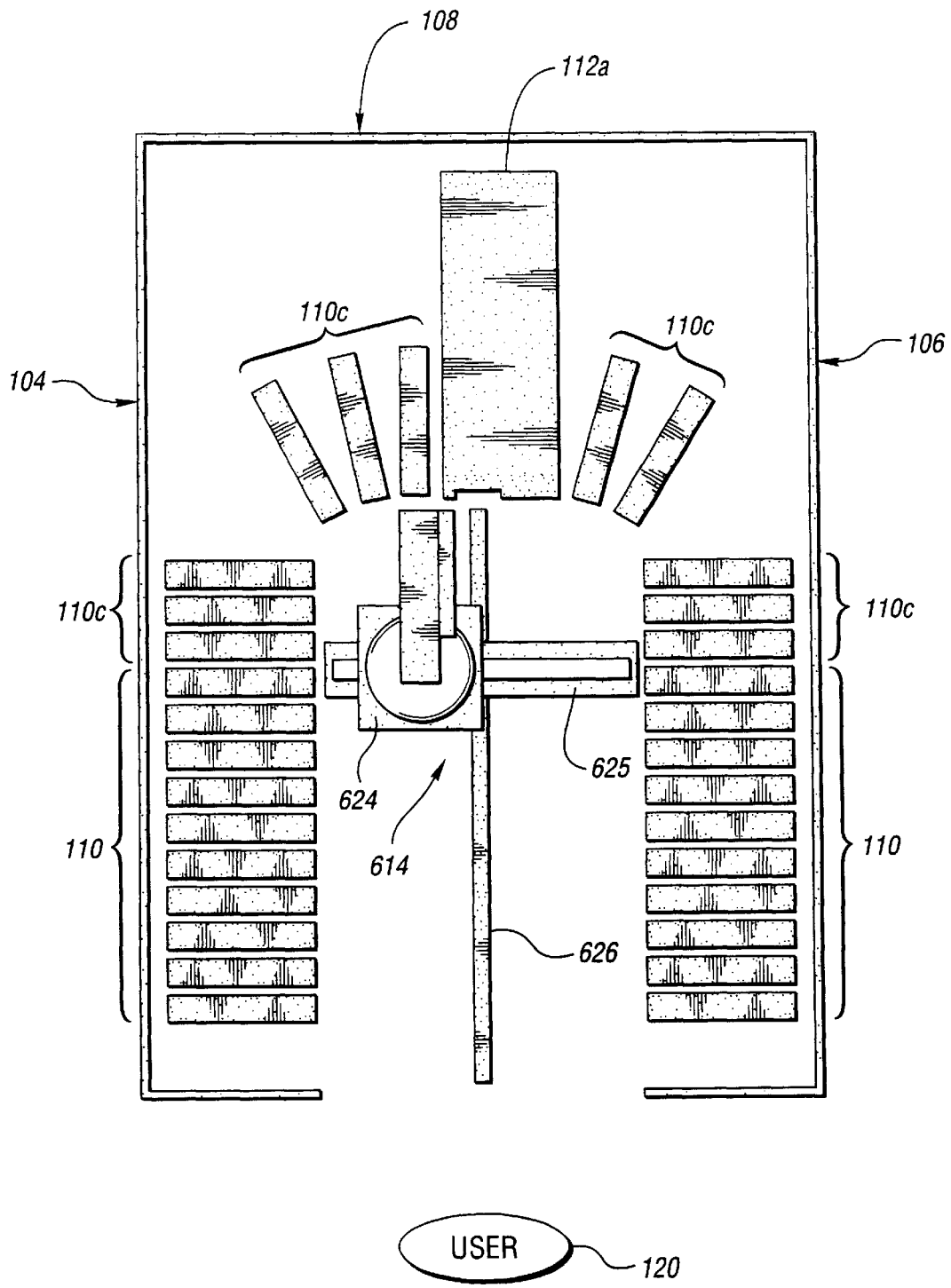
FIG. 6 is a top view of a third embodiment of the present invention where the robotic mechanism has four degrees of freedom.

FIG. 6 is a top view of a third embodiment of the present invention. In this embodiment the horseshoe shape is more squared than the horseshoe shape shown in FIG. 5. Extra storage media cartridges 110c are positioned near the left side 104 and the right side 106 of the housing 100, and to the left and right side of the media drive 112. To accommodate the positioning of the extra storage media cartridges 110c, this embodiment of the robotic mechanism 614 has a second linear stage 625 between the first linear stage 624 and the track 626. The second linear carriage 625 is oriented parallel to the back side 108 of the housing 100. This extra degree of motion in the robotic mechanism 614 allows the extra storage media cartridges 110c to be positioned along shallow curves and straight lines. Positioning the storage media cartridges 110 along shallow curves or straight lines requires only small gaps between adjacent storage media cartridges 110, resulting in an efficient use of the space claim inside the housing 100. As with the embodiment shown in FIG. 5, an additional media drive (not shown) could be installed adjacent the current media drive 112 in place of some or all of the extra storage media cartridges 10c.

Figure 7:
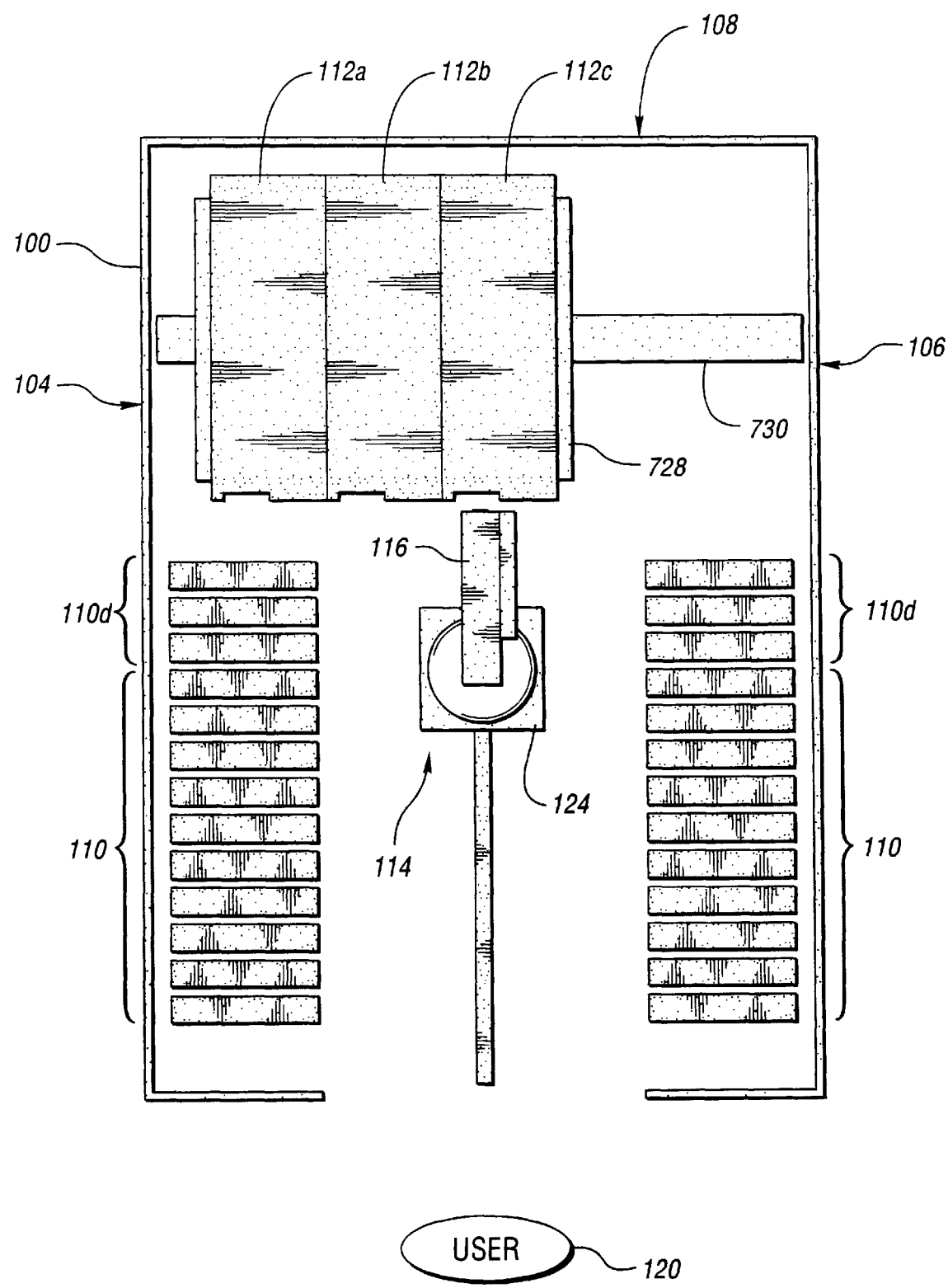
FIG. 7 is a top view of a fourth embodiment of the present invention where the media drives are moved on a linear carriage.

A fourth variation of the present invention is shown in FIG. 7. In this embodiment, the horseshoe shape is squared-off (a cup shape) and three media drives 112a–c occupy the portion of the horseshoe shape adjacent the back side 108 of the housing 100. A rear linear carriage 728, operating on a rear track 730, is used to or align the media drives 112a–c with the picker assembly 116. More storage media cartridges 110d are positioned along the left side 104 and right side 106 of the housing 100 to increase the total capacity of the library over that shown in FIG. 1. One advantage of this embodiment over the other embodiments shown is that all curves have been eliminated from the horseshoe shape allowing for very efficient packaging of the storage media cartridges 110 and 110d and the media drives 112a–c. Another advantage of this embodiment over the embodiment shown in FIG. 6 is that the robotic mechanism 114 has only one linear carriage 124 and thus is smaller and simpler than the robotic mechanism 614. The disadvantage of this embodiment is that the weight of the media drives 112a–c must be moved each time a different media drive 112a–c must be aligned with the picker assembly 116.

Figure 8:
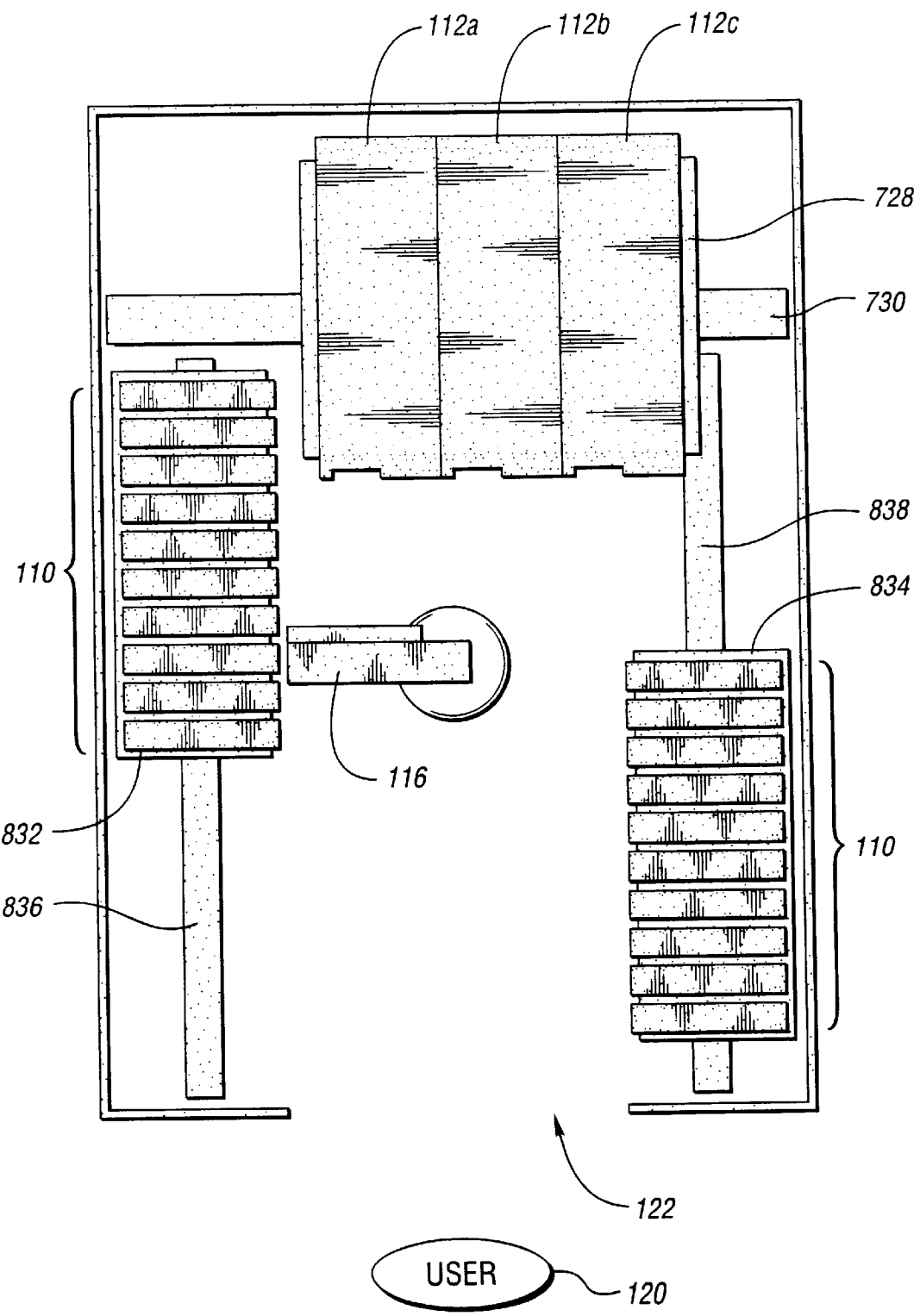
FIG. 8 is a top view of a fifth embodiment of the present invention where the robotic mechanism has two degrees of freedom.

FIG. 8 shows a fifth embodiment of the present invention where the robotic mechanism 814 does not include the linear carriage. In order to align the storage media cartridges 110 with the picker assembly 116, the two rows of storage media cartridges 110 are mounted on a left linear carriage 832 and a right linear carriage 834 operating on a left track 836 and a right track 838 respectively. Alignment of the picker assembly 116 with the media drives 112a–c is accomplished in the same fashion as was shown in FIG. 7, the three media drives 112a–c are mounted on a rear linear carriage 728 operating on the rear track 730. To facilitate mass storage media cartridge 110 removal and insertion, the left linear carriage 832 and the right linear carriage 834 may be designed to be removable from the left track 836 and the right track 838 respectively through the opening 122. Alternatively, demountable magazines (not shown) may be provided on the left linear carriage 832 and the right linear carriage 834 to allow for quick installation and removal of the storage media cartridges 110. The use of magazines can be extended to the other embodiments where the storage media cartridges 110 remain in fixed positions while the robotic mechanism 114 move to achieve alignment. In this case, a left and right magazine, having slots to hold the storage media cartridges, are demountably coupled to a left and right magazine socket respectively. The left and right magazine sockets, in turn, are positioned along the left side 104 and right side 106 of the housing 100 respectively.

Figure 9:
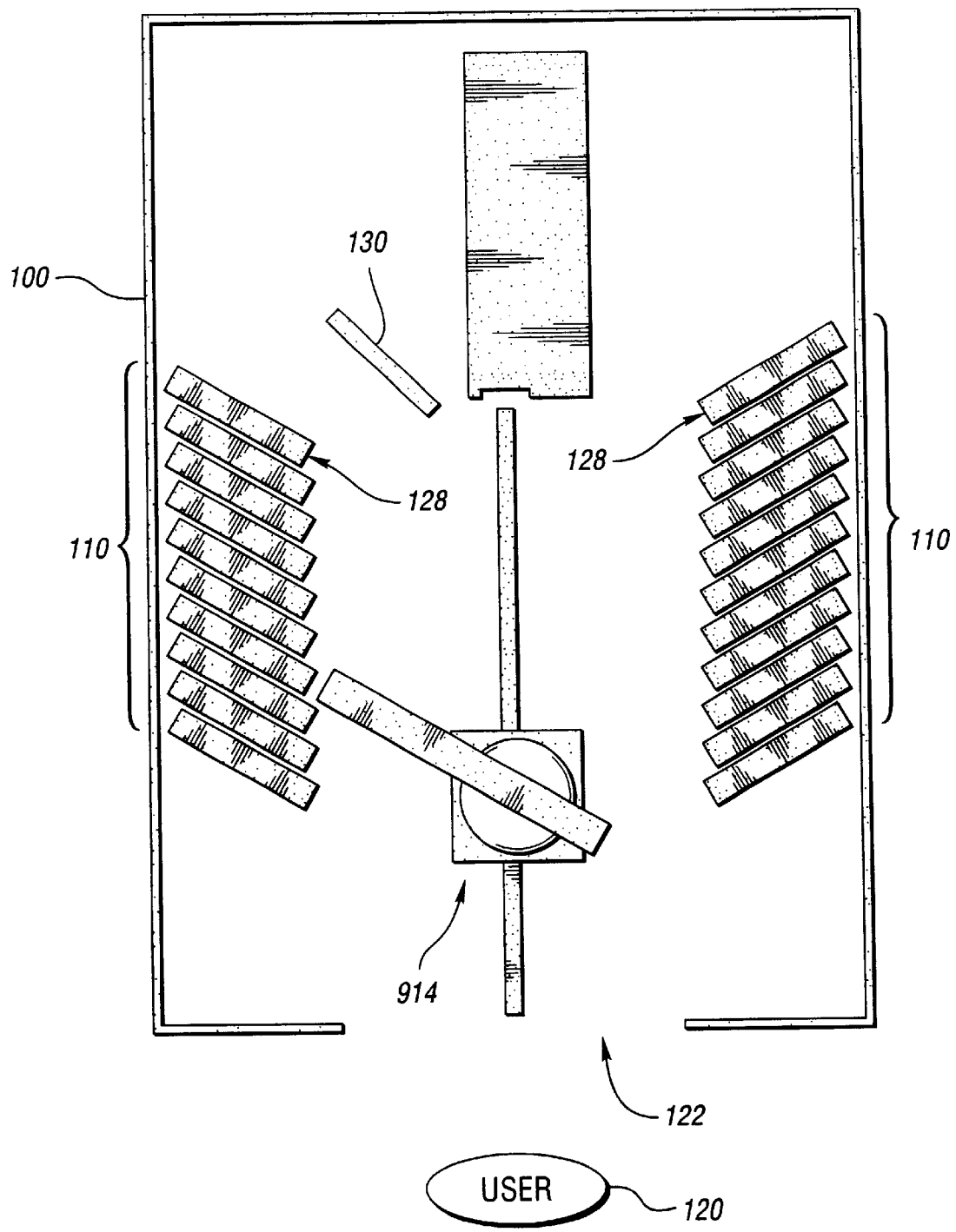
FIG. 9 is a top view of a sixth embodiment of the present invention where the storage media cartridges are disposed at an angle.

FIG. 9 shows a sixth embodiment of the present invention where the storage media cartridges 110 are angled toward the opening 122. This configuration makes it easier for the user 120 to view the label sides 128, and to install and remove the storage media cartridges 110 as compared to the configuration shown in FIG. 1. This configuration also allows the library to accommodate storage media cartridges that are larger than the digital linear tape cartridges without increasing the width of the housing 100. Other types of storage media cartridge formats within the scope of the present invention include, but are not limited to four-millimeter format, eight-millimeter format, quarter inch format, disk format, IBM 3480/3490 format and the like. The media within the storage media cartridges may include, but is not limited to magnetic, optical, metallic films, dye-polymer films, bubble forming material, magneto-optical, amorphous to crystalline phase transition, and semiconductor media.

Another variation shown in FIG. 9 is that the bar-code reader 130 may be mounted in a fixed position with respect to the housing 100 instead of on the robotic mechanism 914. This variation accounts for situations where the bar-code reader 130 cannot be aligned close enough to the storage media cartridges 110 to read the bar-codes on the labels due to interference by neighboring storage media cartridges 110 or other objects. Here, the robotic mechanism 914 must remove the storage media cartridge 110 from its slot, transport the storage media cartridge 110 to, and align the label side 128 with the bar-code reader 130.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage library for recording and retrieving information from a plurality of storage media cartridges, wherein each storage media cartridge has a label side, the storage library comprising:
   a housing having a left side, a right side, a front side, and a back side;
   a left plurality of slots disposed proximate the left side of the housing, the left plurality of slots being aligned in a vertical posture for holding some of the plurality of storage media cartridges in the vertical posture;
   a right plurality of slots disposed proximate the right side of the housing, the right plurality of slots being aligned in the vertical posture for holding some of the plurality of storage media cartridges in the vertical posture;
   at least one media drive disposed proximate the back side of the housing, the at least one media drive being operative to receive one storage media cartridge of the plurality of storage media cartridges through a port aligned in the vertical posture; and
   a robotic mechanism disposed between the left and right plurality of slots, the robotic mechanism being operative to move respective ones of the plurality of storage media cartridges between the plurality of slots and the at least one media drive while maintaining the storage media cartridges in the vertical posture as the robotic mechanism moves the storage media cartridges, wherein the robotic mechanism includes a track, a first linear carriage, a rotational carriage, and a picker assembly each entirely disposed between the left and right plurality of slots, wherein the track runs parallel to the left and right sides of the housing and perpendicular to the back side of the housing, the first linear carriage is disposed on the track and is operable for moving along the track in a path parallel to the left and right sides of the housing and perpendicular to the back side of the housing, the rotational carriage is disposed on the first linear carriage and is operable to rotate between the plurality of slots and the at least one media drive, the picker assembly is disposed on the rotational carriage and is aligned in the vertical posture, the picker assembly being operable to insert and remove a storage media cartridge from the plurality of slots and the port of the at least one media drive while maintaining the storage media cartridge in the vertical posture.

2. The storage library of claim 1 wherein each storage media cartridge has a bar-code on the label side, the storage library further comprising a bar-code reader disposed on the rotational carriage, and operative to read the bar-code on the label side of each storage media cartridge.

3. The storage library of claim 1 wherein the at least one media drive is at least two media drives, the storage library further comprising a rear linear carriage disposed between the at least two media drives and the housing, and operative to move the at least two media drives approximately parallel to the back side of the housing to align each media drive one at a time with the picker assembly.

4. The storage library of claim 1 further comprising at least one additional slot disposed approximate the back side of the housing.

5. The storage library of claim 1 wherein the left plurality of slots are in the form of a left magazine, and the right plurality of slots are in the form of a right magazine, the storage library further comprising at least two magazine sockets demountably coupling the left magazine and the right magazine respectively to the housing.

6. The storage library of claim 1 wherein the left plurality of slots is at least ten slots, and the right plurality of slots is at least ten slots.

7. The storage library of claim 1 wherein the port is approximately facing the front side of the housing.

8. The storage library of claim 1 further comprising:
   an opening provided in the front side of the housing;
   wherein the left plurality of slots are oriented so that each label side of the plurality of storage media cartridges held by the left plurality of slots is visible through the opening, and
   the right plurality of slots are oriented so that each label side of the plurality of storage media cartridges held by the right plurality of slots is visible through the opening.

9. The storage library of claim 1 wherein:
   the left and right plurality of slots, the at least one media drive, and the robotic mechanism are co-planar.

* * * * *